(12) United States Patent
Bongiovanni et al.

(10) Patent No.: US 8,696,965 B2
(45) Date of Patent: Apr. 15, 2014

(54) PREPREGS WITH IMPROVED PROCESSING

(75) Inventors: Christopher Lee Bongiovanni, Anaheim, CA (US); Jack Douglas Boyd, Silverado, CA (US)

(73) Assignee: Cytec Technology Corp., Wilmington, DE (US)

( * ) Notice: Subject to any disclaimer, the term of this patent is extended or adjusted under 35 U.S.C. 154(b) by 733 days.

(21) Appl. No.: 12/581,053

(22) Filed: Oct. 16, 2009

(65) Prior Publication Data

US 2010/0098906 A1     Apr. 22, 2010

Related U.S. Application Data

(60) Provisional application No. 61/106,905, filed on Oct. 20, 2008.

(51) Int. Cl.
  *B29C 45/14*      (2006.01)
  *B29C 65/00*      (2006.01)
  *B32B 3/10*       (2006.01)

(52) U.S. Cl.
  USPC ........... 264/263; 264/102; 264/154; 264/155; 264/156; 264/257; 264/258; 264/259; 264/510; 156/286

(58) Field of Classification Search
  USPC ......... 264/257, 258, 102, 154, 155, 156, 259, 264/263, 273, 413, 425, 510; 156/286; 428/137, 138, 297.4
  See application file for complete search history.

(56) References Cited

U.S. PATENT DOCUMENTS

| | | | | |
|---|---|---|---|---|
| 3,683,736 | A  * | 8/1972 | Loose | 83/16 |
| 4,132,519 | A  * | 1/1979 | Reed | 425/174.2 |
| 4,486,372 | A  * | 12/1984 | Millard et al. | 264/137 |
| 4,747,895 | A  * | 5/1988 | Wallerstein et al. | 156/73.3 |
| H565 | H  * | 1/1989 | Ford et al. | 156/286 |
| 5,066,442 | A  * | 11/1991 | Gutowski et al. | 264/154 |
| 5,104,718 | A  * | 4/1992 | Asada et al. | 428/167 |
| 5,252,279 | A  * | 10/1993 | Gore et al. | 264/154 |
| 5,268,055 | A  * | 12/1993 | Bales et al. | 156/252 |
| 6,106,646 | A  * | 8/2000 | Fairbanks | 156/73.3 |
| 6,391,436 | B1 * | 5/2002 | Xu et al. | 428/298.1 |
| 7,179,517 | B2 * | 2/2007 | Jones et al. | 428/138 |
| 2007/0149080 | A1 | 6/2007 | Asahara et al. | |

* cited by examiner

*Primary Examiner* — Atul P. Khare
(74) *Attorney, Agent, or Firm* — Thi D. Dang

(57) ABSTRACT

Systems and methods for the fabrication of prepregs possessing enhanced ability for the removal of gases from within prepregs and prepreg layups prior to and/or during at least a portion of consolidation and cure process to form composite structures are disclosed. In certain embodiments, perforations of selected configurations may be introduced into the prepregs prior to, during, and after layup. The perforations provide routes for gases trapped within and between the perforated prepregs and prepreg lay-ups to escape during consolidation and cure process, reducing the residual porosity within the resulting composite. For example, composites having residual porosities less than 10 vol. %, on the basis of the volume of the composite, may be achieved in this manner.

10 Claims, 7 Drawing Sheets

PREPREGS WITH IMPROVED PROCESSING

This application claims benefit of priority from U.S. provisional application No. 61/106,905, filed Oct. 20, 2008, the content of which is incorporated herein by reference in its entirety.

BACKGROUND

1. Field

Embodiments of the present disclosure relate to pre-impregnated fibers and, in particular, to methods for the fabrication of perforated prepregs, perforated prepreg layups, and composite structures.

2. Description of the Related Art

Fiber reinforced composites (FRCs) are hybrid structural materials that comprise a matrix component surrounding at least a portion of a fiber reinforcement that is configured in one or more layers. Owing to their relatively high stiffness to weight ratio, as well as their relatively low density, FRCs have found utility in applications, such as aircraft components, where weight is a significant concern.

FRC components may be manufactured using fibers that are pre-impregnated with the matrix component, also known as prepregs. To form a composite part from the prepregs, one or more layers of prepregs are assembled within a mold and heat may be applied to cause the matrix resin to flow, enabling consolidation of the prepreg layers. The applied heat may additionally cure or polymerize the matrix components.

The consolidation of prepregs to form composites in this manner is difficult, however. Gases may be trapped inside the prepreg and between the prepregs during layup and may also evolve during heating and/or curing of the prepregs. These gases are difficult to remove from the layup, as the matrix substantially inhibits movement of the gases and may result in porosity within the composite. This porosity can further reduce the mechanical properties of the composite.

Techniques have been developed to enhance removal of entrapped gases during composite fabrication, however, problems remain. For example, edge breathers may be employed to apply vacuum to the edge of prepregs in order to draw out gases from the sides of prepreg layers. However, removal of trapped gases from prepregs in this manner is slow and may not provide substantially complete removal of the trapped gases.

SUMMARY

In an embodiment, prepregs possessing enhanced ability for the removal of gases, such as air and other volatile species, from within prepregs and prepreg layups are provided. In certain embodiments, perforations of selected configuration are present within the prepregs. The perforations provide routes for gases trapped within the perforated prepregs to escape the prepregs.

In an embodiment, a perforated prepreg is provided where perforations are distributed through at least a portion of the prepreg. The perforations are also dimensionally stable at about room temperature and further enable gas movement through the perforated prepreg.

In another embodiment, a composite made using one or more of the perforated prepregs is provided. The composite possess a porosity of less than 10 vol. % on the basis of the total volume of the composite.

In a further embodiment, a method of making the perforated prepreg is provided. The method comprises applying mechanical manipulation or energy to the prepreg to form in at least a portion of the prepreg one or more perforations.

In an alternative embodiment, a method of forming a fiber-reinforced composite is provided. The method comprises introducing one or more perforations into a prepreg comprising a matrix resin and a fiber embedded within at least a portion of the matrix to form a perforated prepreg. The one or more perforations are configured so as to enable gases to travel from within the body of the perforated prepreg to an external surface of the perforated prepreg.

In another embodiment, a perforated prepreg layup is provided. The perforated prepreg layup may comprise one or more perforated prepregs as discussed above. The perforated prepreg layup may further comprise combinations of the perforated prepreg and prepregs not containing perforations. In a further embodiment, a perforated prepreg is provided wherein the weight fraction of fiber reinforcement in the perforated prepreg is less than 20 wt. % such as for an adhesive film or surfacing film, and may be zero such as for a resin film.

DETAILED DESCRIPTION

Figure 1A:
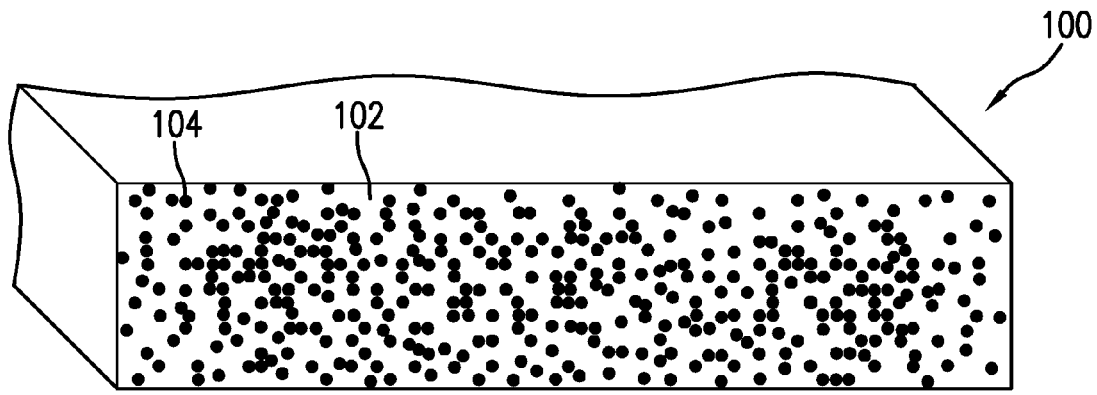
FIGS. 1A-1C are illustrations of embodiments of fully impregnated (1A) and partially impregnated (1B and 1C) prepregs.

The terms "approximately", "about", and "substantially" as used herein represent an amount close to the stated amount that still performs the desired function or achieves the desired result. For example, the terms "approximately", "about", and "substantially" may refer to an amount that is within less than 10% of, within less than 5% of, within less than 1% of, within less than 0.1% of, and within less than 0.01% of the stated amount.

A perforation that possesses a circular cross-section that is substantially uniform may exhibit diameters that are within less than 10% of the mean diameter, within less than 5% of the mean diameter, within less than 1% of the mean diameter, within less than 0.1% of the mean diameter, and within less than 0.01% of the mean diameter. In another example, a perforation that extends substantially perpendicular to a selected plane of a fiber may exhibit orientations that are within less than 10% of the angle of the normal to the plane of the fiber, within less than 5% of the angle of the normal to the plane of the fiber, within less than 1% of the angle of the normal to the plane of the fiber, within less than 0.1% of the angle of the normal to the plane of the fiber, and within less than 0.01% of the angle of the normal to the plane of the fiber.

The term "at least a portion of" as used herein represents an amount of a whole that comprises an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

The term "room temperature" as used herein has its ordinary meaning as known to those skilled in the art and may include temperatures within the range of about 15° C. to 43° C.

The term "fiber" or "fibers" as used herein has its ordinary meaning as known to those skilled in the art and may include one or more fibrous materials adapted for the reinforcement of composites. Fibers may take the form of any of particles, flakes, whiskers, short fibers, continuous fibers, sheets, plies, and combinations thereof. Continuous fibers may further adopt any of unidirectional, multi-dimensional (e.g. two- or three-dimensional), non-woven, woven, knitted, stitched, wound, and braided fibers, as well as swirl mat, felt mat, and chopped mat structures. Woven fibers may comprise a plurality of woven tows having less than about 1000 filaments, less than about 3000 filaments, less than about 6000 filaments, less than about 12000 filaments, less than about 24000 filaments, less than about 48000 filaments, less than about 56000 filaments, less than about 125000 filaments, and greater than about 125000 filaments. Woven tows may be held in position by cross-tow stitches, weft-insertion knitting stitches, or a small amount of resin, such as a sizing.

The composition of the fibers may be varied, as necessary. Fibers include, but are not limited to, glass, carbon, aramid, quartz, polyethylene, polyester, poly-p-phenylene-benzobisoxazole (PBO), boron, silicon carbide, polyamide, Nylon®, silicon nitride, Astroquartz®, Tyranno®, Nextel®, Nicalon®, and graphite, and combinations thereof.

The terms "matrix", "resin", and "matrix resin" as used herein have their ordinary meaning as known to those skilled in the art and may include one or more compounds comprising a thermoset and/or thermoplastic materials. Examples may include, but are not limited to, epoxies, epoxy curing agents, phenolics, phenols, cyanates, imides (e.g., polyimides, bismaleimide (BMI), polyetherimides), polyesters, benzoxazines, polybenzimidazoles, polybenzothiazoles, polyamides, polyamidimides, polysulphones, polyether sulphones, polycarbonates, polyethylene terephthalates, and polyether ketones (e.g. polyether ketone (PEK), polyether ether ketone (PEEK), polyether ketone ketone (PEKK) and the like), combinations thereof, and precursors thereof.

Matrices, as discussed herein, may further comprise soluble, insoluble or partially soluble additives. Such additives may be provided to influence one or more of mechanical, rheological, electrical, optical, chemical, and/or thermal properties of the matrix. Such additives may further comprise materials that chemically react with the matrix, interact with the matrix, or are unreactive with the matrix. The size distribution, and geometry of such additives may also be varied, as necessary. For example, the size of the additives may range between nanoscale dimensions (approximately 1 nm-100 nm), microscale dimensions (approximately 100 nm-100 µm), and macroscale dimensions, greater than about 100 µm. In other examples, the additives may be configured in geometries including, but not limited to, particles, flakes, rods, and the like. In additional examples, the additives may distributed within a selected area of the matrix (e.g. adjacent a surface of the matrix) or evenly distributed or dissolved within the matrix. Examples of additives may include, but are not limited to, organic and inorganic substances such as flame retardants, ultraviolet (UV) protectors, thickeners (e.g., Cabosil®), and reinforcements to enhance one or more of damage tolerance, toughness, wear resistance (e.g., rubbers, ceramics, and/or glasses).

Particularly advantageous additives are rubber particles, thermoplastic particles or combinations which are well known in the art to improve damage tolerance.

The term "impregnate" as used herein has its ordinary meaning as known to those skilled in the art and may include the introduction of a matrix film, powder, liquid, and or solution into at least a portion of the fibers. Impregnation may be facilitated by the application of one or more of heat, pressure, and solvents. "Full impregnation", as discussed herein, may include its ordinary meaning and may further include impregnations that embed substantially all of the fibers within the matrix, such as in prepreg. "Partial impregnation", as discussed herein, includes its ordinary meaning and may include impregnations that are less than substantially full impregnation and contain regions of dry fibers where a portion of the fibers are not embedded within the matrix.

The term "prepreg" as used herein has its ordinary meaning as known to those skilled in the art and thus includes sheets or lamina of fibers that have been impregnated with a matrix resin within at least a portion of their volume. The matrix may be present in a partially cured or uncured state.

The term "layup" as used herein has its ordinary meaning as known to those skilled in the art and may include one or more prepregs that are placed adjacent one another. In certain embodiments, the prepregs within the layup may be positioned in a selected orientation with respect to one another. In a further embodiment, the prepregs may optionally be stitched together with a threading material in order to inhibit their relative motion from a selected orientation. In additional embodiments, "layups" may comprise any combination of fully impregnated prepregs, partially impregnated prepregs, and perforated prepregs as discussed herein. Layups may be manufactured by techniques that may include, but are not limited to, hand layup, automated tape layup (ATL), advanced fiber placement (AFP), and filament winding.

The term "dimensional stability" as used herein has its ordinary meaning as known to those skilled in the art and thus includes the ability of a structure to maintain dimension within a selected range for a selected period of time. In certain embodiments, the selected range may be determined by the ability of the structure to perform an intended function, such as allowing the passage of a gas at a selected rate under a selected pressure.

The term "consolidation" as used herein has its ordinary meaning as known to those skilled in the art and thus includes processes in which the resin or matrix resin flows so as to displace void space. For example, "consolidation" may include, but is not limited to, flow of matrix into void spaces between and within fibers and prepregs, perforations, and the like. "Consolidation" may further take place under the action of one or more of heat, vacuum, and applied pressure.

The terms "cure" and "curing" as used herein have their ordinary meaning as known to those skilled in the art and may include polymerizing and/or cross-linking processes. Curing may be performed by processes that include, but are not limited to, heating, exposure to ultraviolet light, and exposure to radiation. In certain embodiments, curing may take place within the matrix. Prior to curing, the matrix may further comprise one or more compounds that are, at about room temperature, liquid, semi-solid, crystalline solids, and combinations thereof. In further embodiments, the matrix within the prepreg may be formulated or partially cured in order to exhibit a selected stickiness or tack. In certain embodiments, consolidation and curing may be performed in a single process.

Embodiments of the present disclosure provide perforated prepregs, perforated prepreg layups, and methods of manufacture. The perforated prepreg possess enhanced ability for the removal of gases trapped within and between the perforated prepregs and perforated prepreg layups. Trapped gases may be further removed prior to and/or during at least a portion of the consolidation process from the perforated prepregs alone, or when incorporated into perforated prepreg layups, as well as prior to and/or during at least a portion of consolidation processes to form composite structures. In certain embodiments, perforations having selected configurations are introduced into the prepregs prior to layup. In alternative embodiments, perforations having selected configurations are introduced into the prepregs during or after layup. Prior to and/or during at least a portion of consolidation of the prepregs, the perforations provide routes for gases trapped within and between the perforated prepregs or perforated prepreg layups to escape, reducing the residual porosity within the resulting composite and may elevate its mechanical properties. For example, composites having residual porosities of less than 10 vol. %, less than 4 vol. %, and less than 1 vol. %, on the basis of the total volume of the composite, may be achieved in this manner.

In certain embodiments, the perforated prepregs are configured to enable dimensional stability of the perforations. As a result, the perforations, once introduced, may remain dimensionally stable for a selected period of time. In certain embodiments, the perforations may remain dimensionally stable during storage of the perforated prepregs. In other embodiments, the perforations may remain dimensionally stable during at least a portion of the consolidation process. Beneficially, this design of the perforated prepregs allows removal of gases that are trapped within perforated prepregs and between layers of perforated prepregs within perforated prepreg layups.

In certain embodiments, dimensional stability may be provided by tailoring the viscosity of the matrix. For example, relatively high matrix viscosities, greater than about 1,000,000 centepoise (cp) at about room temperature, may provide perforations with dimensional stability. Preferably, the matrix resin is adapted to form dimensinoally stable perforations at about room temperature and is capable of flowing at a selected temperature greater than room temperature to fill one or more of the perforations.

In further embodiments, perforations may be introduced into fully or partially impregnated prepregs. As discussed in greater detail below, it is possible to fabricate perforated prepregs in which a portion of the prepreg fibers are not impregnated with the matrix resin, a partially impregnated prepreg. By introducing perforations within such partially impregnated prepregs, gases may travel through the non-impregnated portions of the perforated prepreg, the perforated portions, inter-layer areas between prepreg in prepreg layups, and combinations thereof, enhancing the ability of gases to escape partially impregnated, perforated prepregs and layups. Beneficially, the ability of perforations to be introduced into either fully or partially impregnated prepregs allows the methods discussed herein to be used with a wide range of prepregs and applications.

In additional embodiments, the configuration of the perforations may be further varied in order to further enhance the ability of gases to escape from the prepregs prior to and/or during at least a portion of the consolidation. In one example, the perforations may extend partially or completely through the thickness of the prepregs. In another example, the perforations may be distributed through the prepreg in a controlled manner, allowing for removal of gases from throughout the prepreg, facilitating the formation of homogenous composites. In a further example, parameters of the perforations, including, but not limited to, size, shape, distribution, and perforation density (number of perforations per unit area) may be varied, as necessary.

Figure 1B:
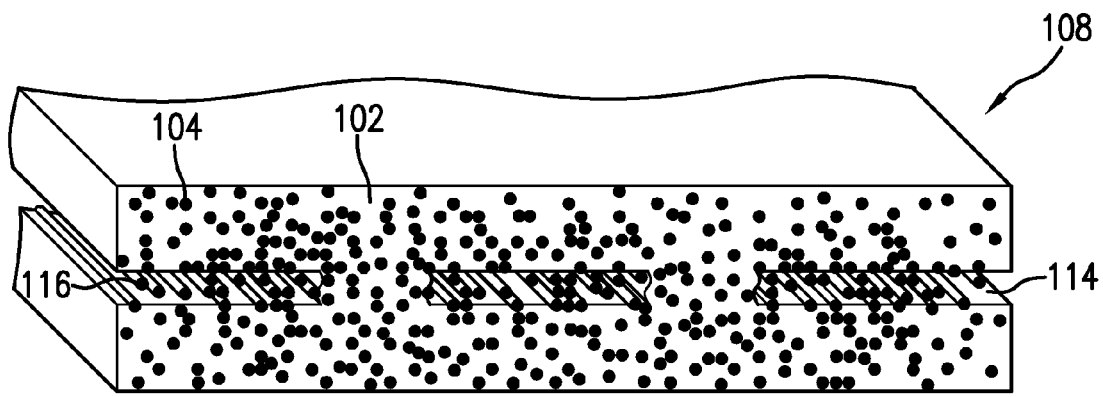

FIGS. 1A-1B illustrate embodiments of fully and partially impregnated prepregs 100, 108. In one embodiment, the prepregs 100, 108 comprise fibers 104, and a matrix 102 that has been impregnated into at least a portion of the fibers 104.

Figure 1C:
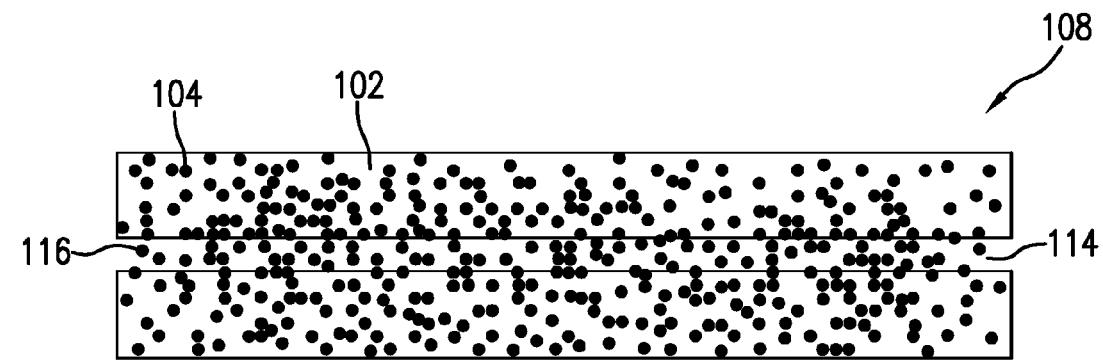

The matrix 102 may be fully or partially impregnated into the fibers 104 in the form of solids, semi-solid films, powders, and liquids, with or without application of heat and/or pressure. In one example, a fully impregnated prepreg 100 may have fibers that are substantially embedded within the matrix 102. In another example, a partially impregnated prepreg 108 may contain selected areas that are substantially free from the matrix 102, such as matrix free zone 114 containing dry fibers 116 that are not substantially embedded within matrix 102 as shown in FIG. 1C. In another example, a partially impregnated prepreg 108 may contain selected areas that are partially free from matrix 102, such as shown as matrix free zone 114 containing mostly dry fiber 116, with some fibers in matrix free zone 114 embedded within matrix 102 as shown in FIG. 1B. In one embodiment, partially impregnated prepregs 108 may be formed by impregnating fibers 104 from two sides, leaving a matrix free zone 114 that is substantially without matrix 102 within the interior of the prepreg 108. In another example, partially impregnated prepregs 108 may be formed by impregnating fibers 104 from a single side. As discussed below, the matrix free region 114 may cooperate with introduced perforations to enable removal of gases from partially impregnated prepregs 108 during the consolidation and/or cure process.

Prepregs 100, 108 may be formed using a number of techniques including, but not limited to, solution processes, such as solution dip and solution spray, as well as melt and working processes, such as direct melt and film calendaring. These processes are designed to bring at least a portion of the fibers 104 into contact with the matrix 102 in a flowable or malleable state and impregnate the fibers 104 with the matrix 102. To facilitate the layup process, the tack of the matrix 102 may be adjusted accordingly during and/or after matrix impregnation.

In solution dip processes, the fibers 104 may be passed through a bath of matrix solids that are dissolved within a solvent. As the fibers 104 pass through the bath, they pick up an amount of matrix solids that varies with factors such as the speed at which the fibers 104 are passed through the bath and the content of matrix solids within the bath. In solution spray processes, a selected amount of matrix solids are sprayed upon the fiber 104. In each case of solution processing, the impregnated fiber 104 is heated after exposure to the bath or spray in order to substantially remove the solvents and may further cause the matrix to begin the curing process.

In direct melt processes, the matrix 102 is provided as an approximately solvent-less coating directly upon the fiber 104. At application temperatures, the matrix 102 is sufficiently flowable so as to impregnate at least a portion of the fibers 104 to form the prepregs 100, 108. Alternatively, in film calendaring, the matrix 102 is cast into a film from melt or solution. The fibers 104 are subsequently sandwiched between one or more matrix films, or one film applied from one side, and calendared so as to work matrix films into the fibers 104.

Additives may also be added to the matrix 102 prior to or after impregnation. In one embodiment, additives may comprise particulates that are added by sprinkling upon or within the matrix 102. Such additives may also be advantageous for the removal of gases between layup plies because gases may move more freely through the passageways created by the additives positioned between the plies. Such particulate additives may include but are not limited to particles, such as any combination of thermoplastic particles, thermoset particles, siliceous particles, glass particles, rubber and inorganic particles having a mean diameter less than about 200 µm.

The fiber content of the prepreg 100, 108 may also be varied, as dictated by the application. In one embodiment, the weight fraction of fiber 104 may range between about 20 to 80 wt. %, on the basis of the total weight of the prepregs 100, 108. In a further embodiment the weight fraction of fiber 104 in a perforated prepreg is less than 20 wt. % such as for an adhesive or surfacing film, and may be zero such as for a resin film. The perforated prepreg of such an embodiment may be advantageously used as an adhesive or surfacing film where the perforations provide pathways for the removal of gases from a surface, from between adherents or from core. Such adhesives would include co-curable bonding applications for composites, metal and sandwich structure applications. Advantageous embodiments where the weight fraction of fiber 104 in a perforated prepreg is less than 20 wt. % or none at all include an adhesive, for example wherein the fibers in the adhesive are a lightweight polyester or nylon scrim.

The fraction of the prepregs 100, 108 occupied by the matrix 102 may also be varied, as desired. In certain embodiments, the matrix 102 may occupy between about 20 to 80 wt. % of the prepregs 100, 108, on the basis of the total weight of the prepregs 100, 108.

Figure 2A:
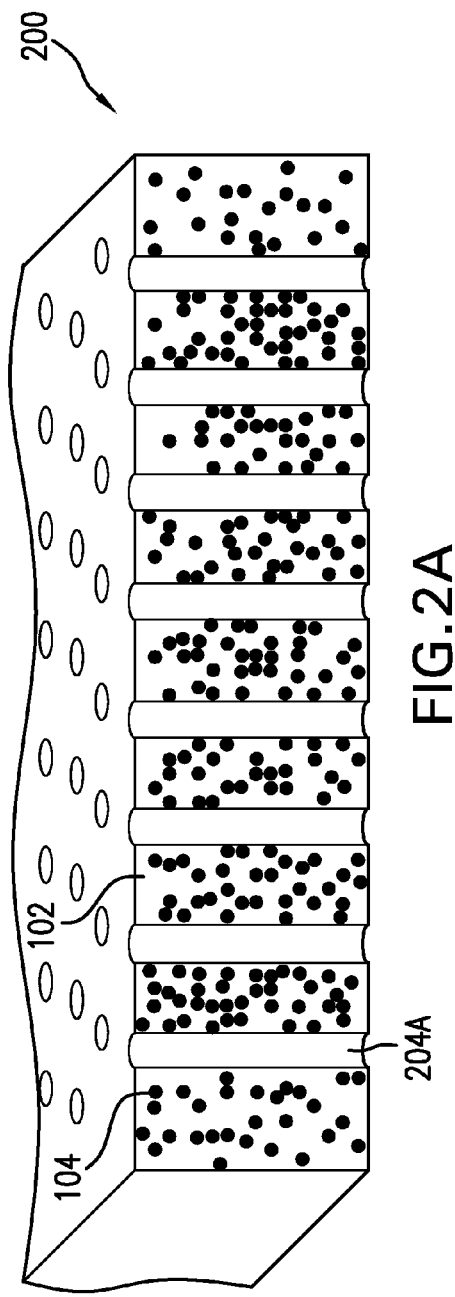
FIGS. 2A-2B are illustrations of embodiments of fully and partially impregnated prepregs, respectively, having perforations.
Figure 2B:
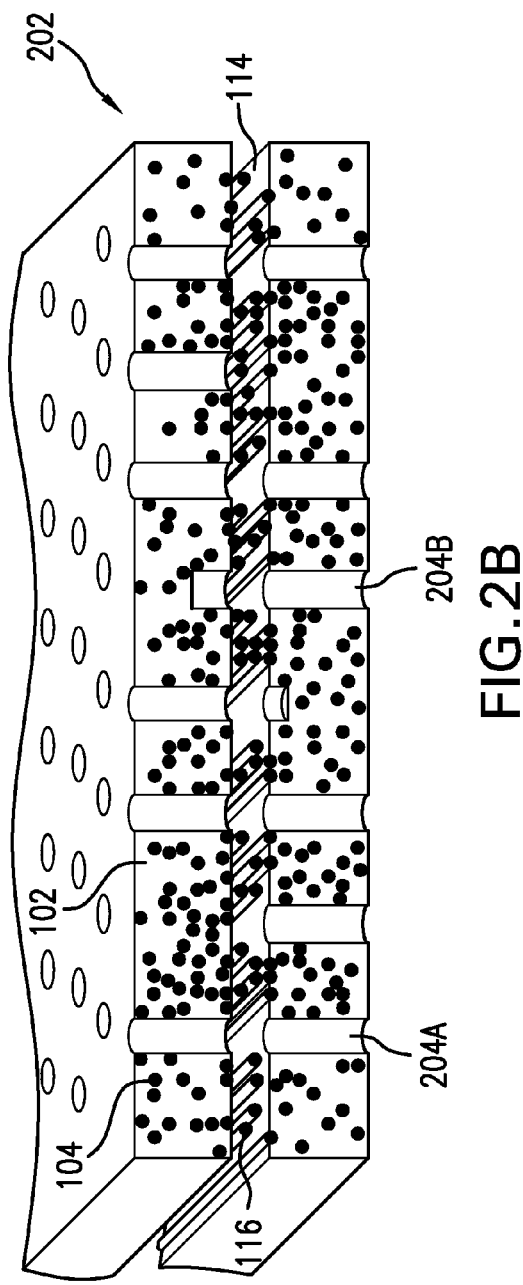

FIGS. 2A-2B illustrate embodiments of fully and partially impregnated prepregs 200, 202 having perforations 204A and partial perforations 204B. In certain embodiments, perforations 204A may extend substantially through the width of prepregs 200, 202, while partial perforations 204B may extend through a selected portion of the width of prepregs 200, 202.

The perforations 204A, 204B may comprise passageways that are introduced into the prepregs 100, 108 and may include, but are not limited to, penetrations, holes, pores, slits, gaps, cracks, and combinations thereof. The perforations 204A, 204B may be substantially uniform along their length, substantially non-uniform along their length, and combinations thereof. The perforations 204A, 204B may be further oriented at a selected angle with respect to the long axis of the fibers 104. For example, the perforations 204A, 204B, may extend approximately perpendicular to the long axis of the fibers 104.

Without being bound to a specific theory, perforated prepregs 200, 202 may facilitate the removal of gases from individual perforated prepregs 200, 202 and prepreg layups 300, 310 incorporating perforated prepregs 200, 202 (FIGS. 3A-3B) prior to and/or during at least a portion of the consolidation and thus reduce the volume of porosity within composites formed therefrom, as compared to composites formed without perforated prepregs 200, 202. For example, perforations 204A, 204B provide escape routes for gases from the perforated prepregs 200, 202 and enable the gases to be removed from the perforated prepregs 200, 202 with greater ease and in greater volume as compared with non-perforated prepregs. The gases may include intralayer gases 302A that originate from within the matrix 102 or matrix free zone 114 of partially and/or fully impregnated prepregs 200, 202 and interlayer gases 302B, 302C that originate from the interlayer region from within the matrix 102 and between prepreg layers in prepreg layups. In particular, perforated prepregs 200, 202 are believed to be suited to the removal of gases that may evolve during consolidation.

Figure 3A:
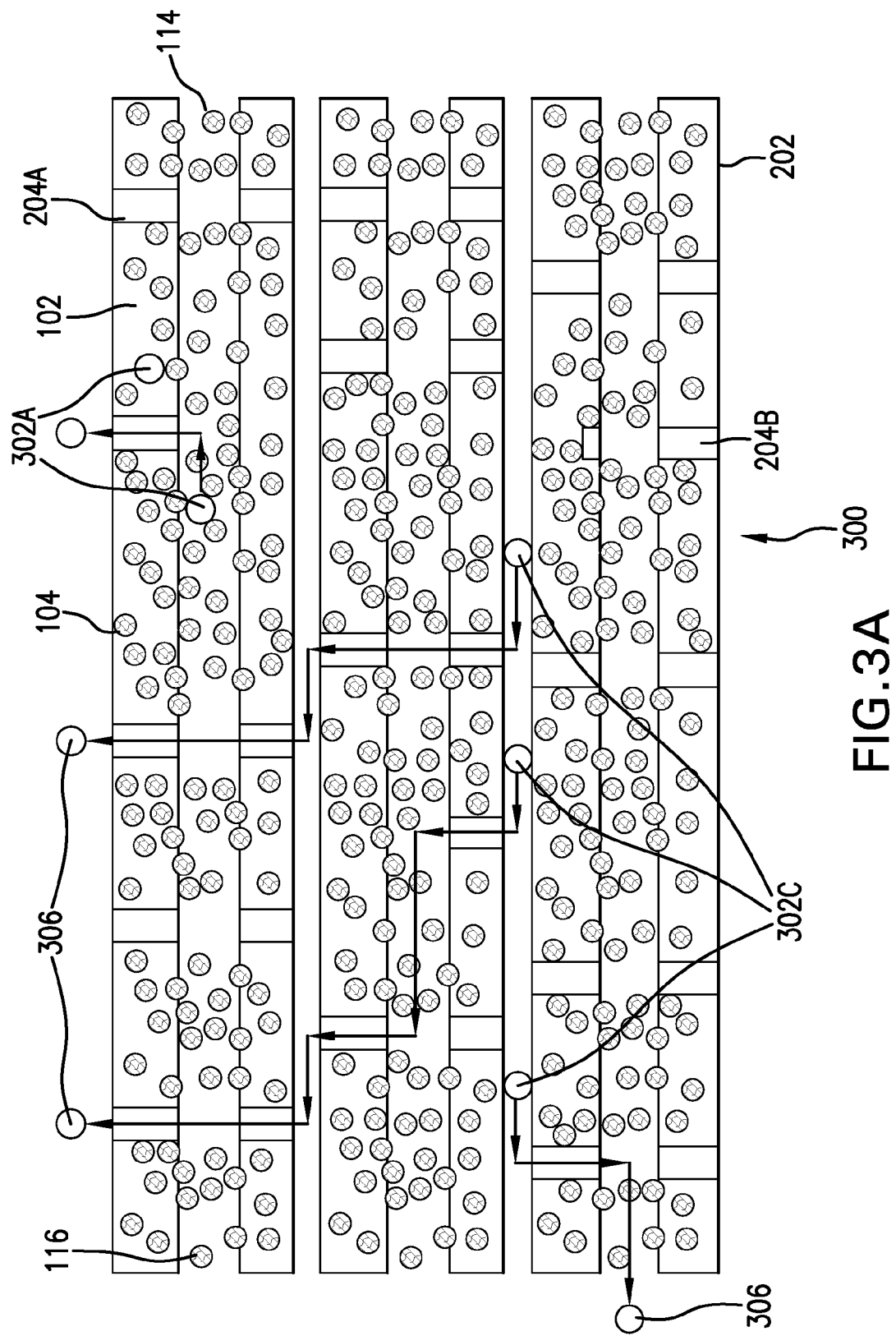
FIGS. 3A-3B are illustrations of possible mechanisms by which gases may be substantially removed from the fully and partially perforated prepregs and prepreg layups of FIGS. 2A-2B, respectively.
Figure 3B:
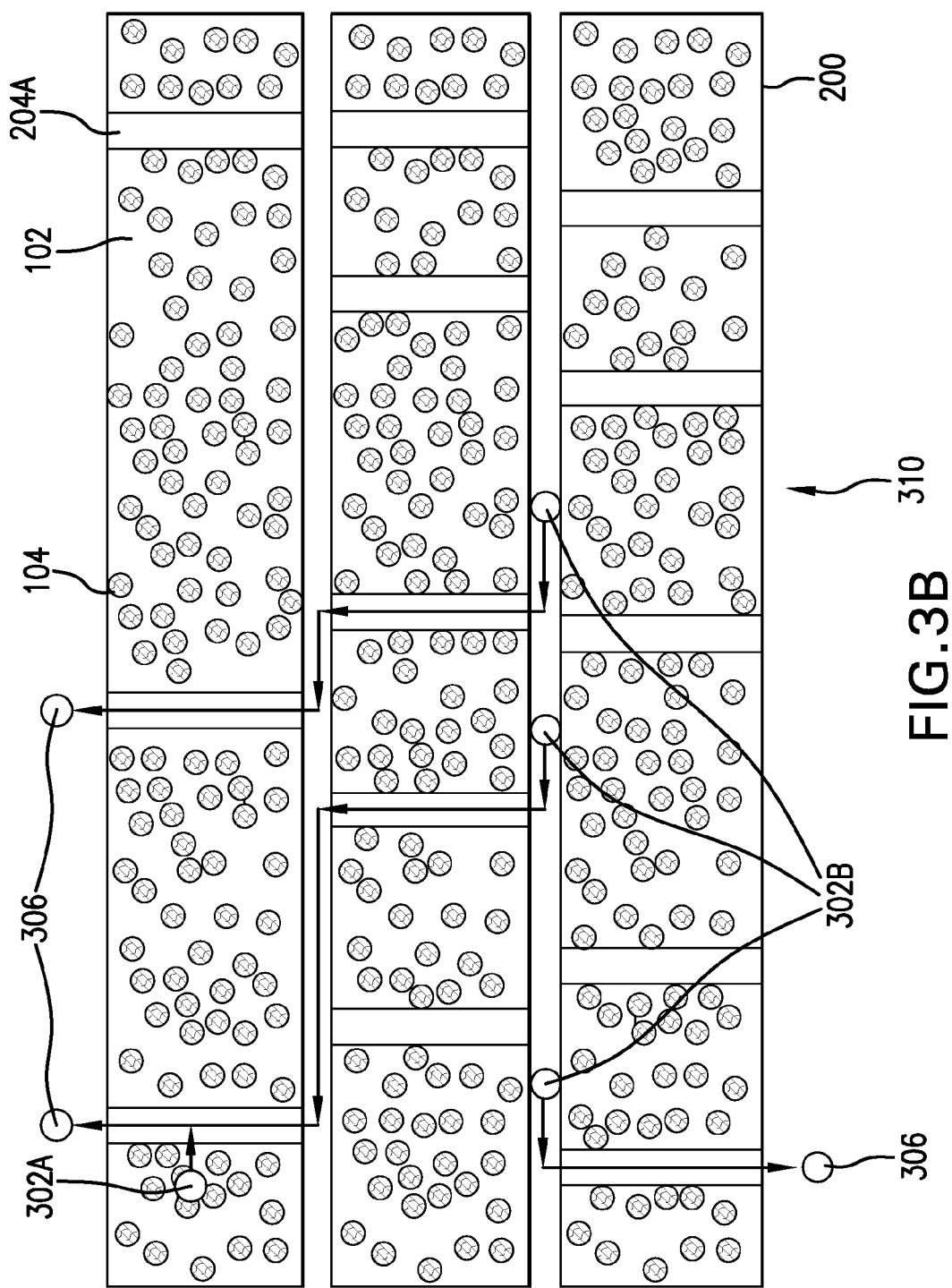

FIGS. 3A and 3B illustrate embodiments of partially impregnated perforated prepreg layups 300 and fully impregnated perforated prepreg layups 310 from which gases may be removed. It may be understood that embodiments of the disclosure may include layups comprising any Combination of fully impregnated prepregs 100, partially impregnated prepregs 102, fully impregnated perforated prepregs 200, and partially impregnated perforated prepregs 202.

As illustrated in FIGS. 3A-3B, gases 302A, 302B, 302C within the perforated prepregs 200, 202 may move through any combination of the matrix 102, matrix free zones 114, and perforations 204A, 204B in order to travel out of the perforated prepregs 200, 202. For example, under the influence of a force, which may arise due to matrix flow, applied pressure, and/or vacuum, the gases 302A, 302B, 302C may be urged from between and/or within an adjacent perforation 204. Once in the perforation 204, the gases 302A, 302B, 302C may easily travel out of the perforated prepregs 200, 202, without substantial resistance from the matrix 102.

As further illustrated in the partially impregnated perforated prepreg layup 300 of FIG. 3A, the matrix free zone 114 may enable communication of gases 302A, 302C between any combination of two or more perforations 204A and 204B. For example, once gases 302A, 302C enter perforation 204A, instead of following the perforation 204A to travel out of the perforated prepreg 202, the gases 302A, 302C may travel through the matrix free zone 114 to perforation 204C before traveling out of the perforated prepreg 202. In another example, gases 302A, 302C may travel through one or more perforations 204A, 204B to the matrix free zone 114, where the gases 302A, 302C may travel through the matrix free zone 114 in order to escape the partially impregnated perforated prepreg layup 300. Beneficially, the ability of the gases 302A, 302C to move between perforations 204A, 204B may allow the gases 302A, 302C a variety of routes from the perforated prepreg 202. Such alternative routes may be beneficial under circumstances in which one or more perforations 204A, 204B is blocked or otherwise impassible, as the gases 302A, 302C may still travel out of the perforated prepregs 200, 202 through other combinations of perforations 204A, 204B and the matrix free zone 114.

Figure 4:
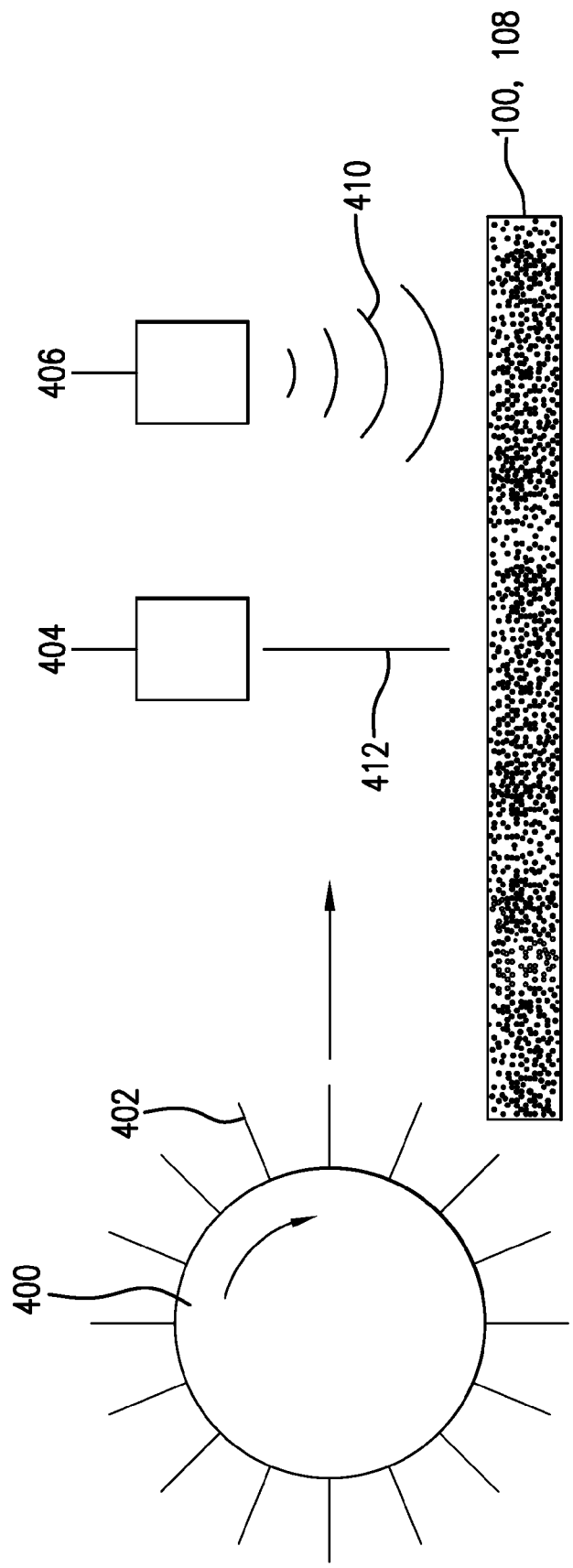
FIG. 4 illustrates methods for the introduction of perforations within prepreg systems.

In certain embodiments, the perforations 204A, 204B may be introduced into the prepregs 100, 108 after matrix impregnation by the application of energy, as illustrated in FIG. 4. The energy may further comprise at least one of mechanical and heat energy. While fully and partially impregnated prepregs 100, 108 are discussed below in the context of introducing perforations 204A, 204B, it may be understood that perforations may also be introduced into fully impregnated perforated prepregs 200 and partially impregnated perforated prepregs 202. Furthermore, perforations 204A, 204B may be introduced into layups having any combination of fully impregnated prepregs 100, partially impregnated prepregs 102, fully impregnated perforated prepregs 200 and partially impregnated perforated prepregs 202.

In certain embodiments, the perforation process may break a number of fibers in the prepreg. In certain embodiments, the perforations 204A, 204B are introduced such that mechanical properties such as tensile strength, tensile modulus, and compression strength of composites formed from perforated prepregs 200, 202 is reduced by less than 10%, less than 5%, and/or less than 1%, as compared to a composite fabricated from comparable prepregs without perforations.

In one embodiment, mechanical energy may be applied through the use of a piercing tool 400 having one or more protrusions 402, such as a pin roller. In one embodiment the piercing tool 400 may be a pin roller containing a plurality of pins each pin being from about 100 µm high to about 5 cm high or more, more preferably about 1 mm to about 25 mm, as is needed to penetrate the prepreg to the desired depth. Each pin may be of any assorted shape such as conical, trapazoidal, beveled, etc. with a mean diameter of about 1 µm to about 10 mm, more preferably about 500 µm to 1500 µm at the surface of the prepreg when penetrated into the prepreg The plurality of pins may be of the same or different height and diameters. The pins are preferably terminated in a sharp tip, but may be terminated by a tip that is blunt, rounded beveled or other desired shape. The protrusions 402 of the piercing tool 400 may pierce the prepregs 100, 108, through at least a portion of their thickness in order to introduce the perforations 204A, 204B. The protrusions 402 may be further configured in about the size, density, and/or pattern desired for the perforations 204A, 204B. In alternative embodiments, a plurality of piercing tools 400 may be employed in order to achieve the desired configuration of perforations 204A, 204B.

In a further embodiment, mechanical energy may be applied to the prepregs 100, 108 through the use of an ultrasound device 406 capable of emitting ultrasound waves 410. The ultrasound waves 410 comprise pressure waves having a frequency within the ultrasonic range. Upon entering the prepreg 100, 108, the pressure waves may cause the matrix 102 to fracture, generating the penetrations 204A, 204B. The formation of penetrations 204A, 204B by ultrasound waves 410 may also be facilitated by cooling the prepregs 100, 108 so as to reduce the energy required to fracture the matrix 102. In a further embodiment, mechanical manipulation is applied to cooled prepregs to form pores or perforations.

In another example, heat energy may be applied through the use of a laser 404. A beam 412 of the laser 404 is configured to burn a perforation 204A, 204B of selected depth through the prepregs 100, 108. The cross-sectional area of the beam 412 may be approximately equal to the cross-sectional area of the desired perforation 204.

Figure 5A:
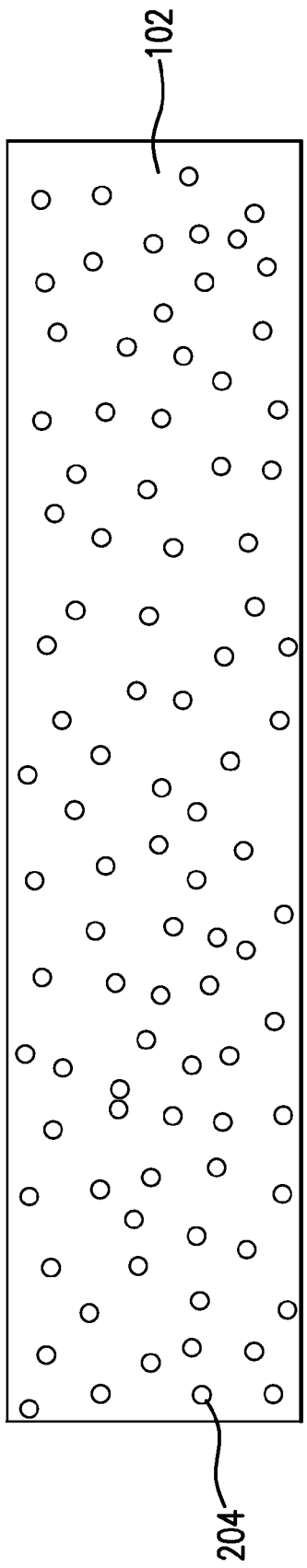
FIGS. 5A-5B are top down views of embodiments of prepregs having distributed perforations; (A) random perforation distribution; (B) substantially uniform perforation distribution.
Figure 5B:
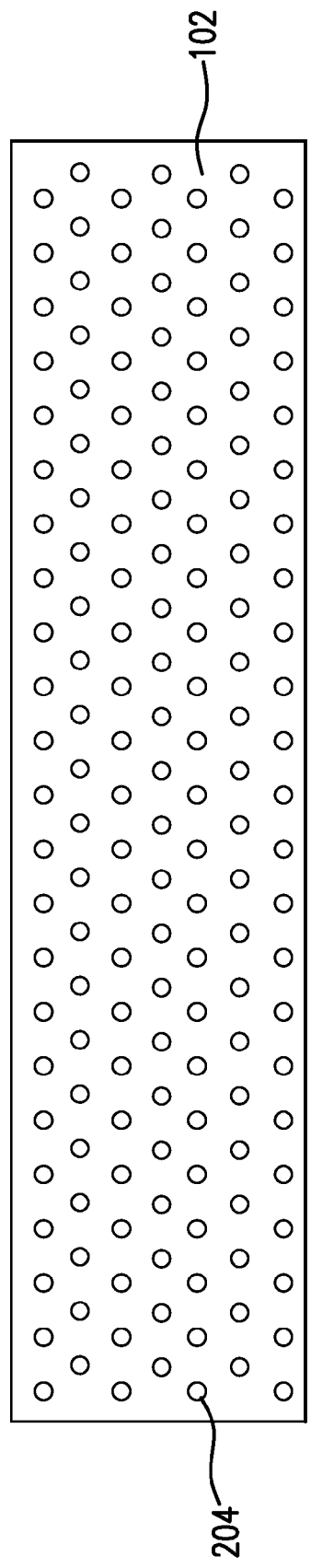

The perforations formed may be of any size diameter sufficient for the escape of gases from the perforated prepreg or perforated prepreg layup. For example, the mean diameter of each perforation may be from about 1 µm, or less, to about 5000 µm, or more, and preferably about 50 µm to about 500 µm, depending upon the density of the perforations and other factors such that the plurality of perforations allows sufficient escape of gases. In further embodiments, the distribution of the perforations 204 may be selected so as to enable the gases 302A, 302B, 302C to escape the perforated prepregs 200, 202, as illustrated in the top down views of FIGS. 5A-5B. For example, the perforations 204 may be distributed over approximately the entire volume of the perforated prepregs 200, 202. The distribution may be random, as illustrated in FIG. 5A, or approximately uniform, as illustrated in FIG. 5B. In one embodiment, the perforations 204 may be present in an average density greater than about one perforation per 20 square cm to as many as needed to allow sufficient escape of gases depending on perforation diameter. In a further example, the perforations 204 may be distributed in a selected pattern. Additionally, the perforations 204 may be separated by a selected distance (e.g. edge to edge distance, center to center distance, and the like), such as about 0.01 to 100 mm. Advantageously, by distributing the perforations 204 within the entire volume of the perforated prepregs 200, 202, gases 302A, 302B, 302C may escape from throughout the volume of the perforated prepregs 200, 202, inhibiting the development of regions of inhomogeneous porosity. It may be understood, however, that in alternative embodiments, perforations 204A, 204B may be introduced into a selected portion of the prepregs 100, 108, rather than through substantially the entire volume of the prepregs 100, 108.

In further embodiments, the viscosity of the matrix 102 may be configured so as to enable the perforations 204 to remain dimensionally stable. Beneficially, dimensional stability of the perforations 204 may permit handling of the perforated prepregs 200, 202 during manufacture, storage, and use, without excessive precautions. The perforations formed are completely or substantially devoid of carbon fibers as well as matrix resin.

In another embodiment, the viscosity of the matrix 102 may be configured to flow and fill void spaces within and between the perforated prepregs 200, 202 during consolidation. For example, in one embodiment, the viscosity of the matrix 102 may be configured to flow and fill void spaces upon application of heat, without external pressure. In other embodiments, the viscosity of the matrix 102 may be configured to flow and fill void spaces upon application of heat and external pressure and/or vacuum. Beneficially, by allowing the perforations 204A, 204B and other void spaces to be filled during consolidation, the perforations 204A, 204B and other void spaces can configured so as to not contribute to the porosity of the resultant composite.

In further embodiments, perforated prepregs 200, 202 may be configured to exhibit varying levels of tack. Advantageously, perforated prepregs 200, 202 exhibiting a relatively high level of tack may be suitable for the fabrication of complex composite parts, as they may be positioned in relatively tight radii.

Figure 6:
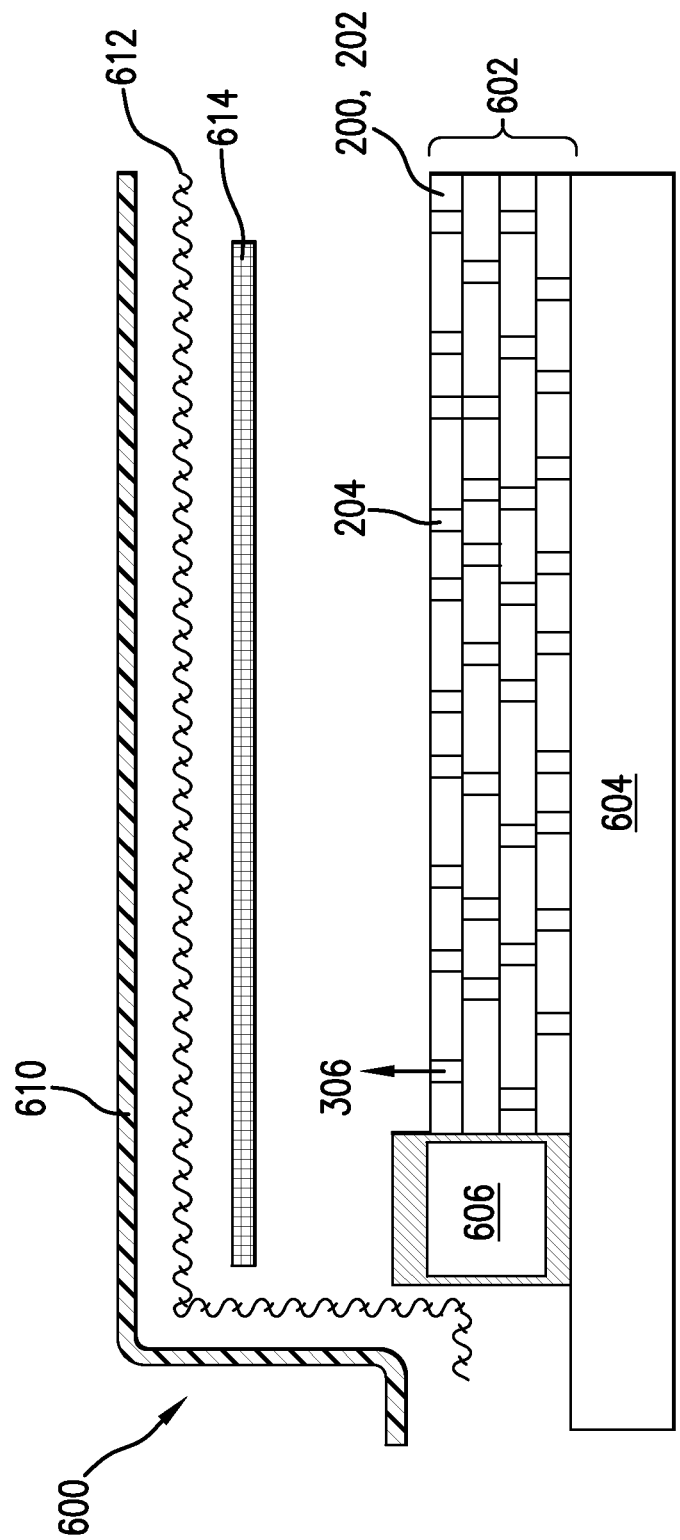
FIG. 6 illustrates one embodiment of a system for the consolidation and cure of perforated prepregs to form composite structures.

FIG. 6 illustrates one embodiment of a system 600 for the consolidation and cure of perforated prepregs 200, 202. In certain embodiments, the perforated prepregs 200, 202 are configured as lamina that are designed to be stacked together in a selected orientation or layup 602, consolidated, and cured to form a composite part. For example, in perforated prepregs 200, 202 having unidirectional orientations of the fiber 104, the fibers 104 may be oriented at 0°, 90°, or a selected angle θ with respect to the largest dimension of the prepreg 100, 108. Perforated prepregs 200, 202 having any combination of orientations may be combined to form the layup 602. Similarly, layups 602 may be generated for perforated prepregs 200, 202 having other fiber architectures.

The layup 602 may further comprise materials placed between one or more of the perforated prepreg layers within the layup 602. In one embodiment, a center core comprising wood, foam, honeycomb, or other structural materials may be so placed. Alternatively or additionally, doubler layers may be placed between the perforated prepreg layers so as to create elongated reinforcing regions. Furthermore, unimpregnated, or partially impregnated lightweight scrims, such as fiberglass, carbon, thermoplastic or other materials woven or unwoven, for example as described in U.S. Patent Publication No. 2005/0255766, may be introduced within the layup 602 in selected localities in order to facilitate removal of gases 302A, 302B, 302C or to increase mechanical properties such as damage tolerance.

In further embodiments, a continuous or discontinuous resin film having a lower viscosity than the matrix resin may be added to the prepreg 200/202 and/or layup 602 in order to improve tack. The addition of such a resin film to the layup 602 may facilitate preparation of the prepreg 200/202 layup 602, especially under circumstances where the matrix of the prepregs 200, 202 comprise additives, such as particles, or scrims. The resin film may be, and is preferably, perforated.

In embodiments of the layup 602 incorporating core structures, an adhesive material may also be employed in order to bond the core to the prepreg material during curing of the prepregs. As open center core structures, such as honeycomb structures, may contain a significant amount of gases, the adhesive layer may also be perforated or reticulated in order to facilitate removal of the gases. In additional embodiments, perforations 204A, 204B may be introduced through the prepregs 100, 102A, adhesive layers, and core layers in order to provide a substantially unobstructed path for gases 302A, 302B, 302C to be removed.

The layup 602 may be placed in contact with a tool 604 which provides a template shape for the perforated prepregs 200, 202 to adopt during consolidation and curing. For example, the tool 604 may comprise a relatively planar surface, curved surfaces, and combinations thereof. In one embodiment, a second tool may be located opposite the tool 604 so as to mold the face of the layup 602 adjacent the second tool. A force may be applied to tool 604 and the second tool to consolidate perforated prepregs 200, 202 and heated to cure perforated prepregs 200, 202 in a press cure system. A vacuum envelope 610 is optional to such a press cure system. To inhibit flow of the matrix 102 outside of the layup 602, or to improve gas flow one or more dams 606 may also be placed adjacent the edges of the layup 602.

Layup 602 and tool 604 may be further enclosed by a vacuum envelope 610 with a breather 612, such as unimpregnated fiberglass. In one embodiment, the breather 612 may be positioned adjacent at least one of the horizontal surfaces of the layup 602 for surface breathing. In another embodiment, the breather 612 may be placed adjacent one or more edges of the layup 602 for edge breathing. In further embodiments, the breather 612 may be positioned for both surface and edge breathing. Sealant tapes may be further employed, as necessary, to create an approximately vacuum tight seal between the tool 604 and the vacuum envelope 610.

In further embodiments, a separator film 614 may be introduced between the prepregs 200, 202 and the breather 612 at one or more surfaces in order to facilitate removal of fabricated composites from the system 600. In certain embodiments, the separator film 614 may be gas permeable. In alternative embodiments, the separator film 614 may be perforated. In additional embodiments, the separator film 614 may be substantially gas impermeable but may allow gases 302A, 302B, 302C to travel to edges of the layup 602 for removal.

Vacuum may be applied to the vacuum envelope 610 via the breather 612, to facilitate the removal of gases 302A, 302B, 302C from the layup 602. The layup 602 may be further heated with pressure, such as within an autoclave, or without pressure, such as within an oven, in order to lower the viscosity of the matrix 102 and induce pressure differentials that allow the matrix 102 to flow. The matrix flow may fill evacuated areas and displace gases 302A, 302B, 302C from the layup 602. The matrix 102 may further flow and enter the perforations 204 and other evacuated or open volume within the lay-up when the viscosity of the matrix 102 is sufficiently low in order to facilitate consolidation.

Upon completion of consolidation and curing of the layup 602, the layup 602 forms the composite part, which may possess a porosity less than about 10 vol. % on the basis of the total volume of the composite.

EXAMPLES

The following examples are provided to demonstrate the benefits of the embodiments of the disclosed perforated prepregs. For instance, it has been observed that perforated prepregs 200, 202 significantly improve the removal of gases from perforated prepreg layups 300, 310, without edge breathing, as compared to prepregs without perforations, and yield low porosity composites upon consolidation and curing. Furthermore, the examples show that the rate of removal of gases 302A, 302B, 302C from within and between layers of perforated prepregs within a layup was found to be greater than that of comparable prepregs without perforations. These examples are discussed for illustrative purposes and should not be construed to limit the scope of the disclosed embodiments.

Example 1

Carbon Fiber/Epoxy Composites Fabricated from Partially Impregnated Prepregs with Vacuum Bag Only (VBO) Conditions in an Oven Three carbon fiber/epoxy composites, trials 1, 2, and 3, were fabricated from partially impregnated prepregs enclosed within a vacuum bag enclosure and subjected to vacuum pressure only (no autoclave pressure). This manner of processing is also referred to as vacuum bag only (VBO) processing. The use of edge breathing or sealing and the presence and absence of perforations were varied to examine the effect of each upon the composite porosity. It was observed that composites fabricated from perforated prepregs with sealed edges (without edge breathing), exhibited significantly lower porosity than composites fabricated under substantially identical conditions from prepregs without perforations. Furthermore, the porosity level of composites fabricated from perforated prepregs, with edges sealed, exhibited approximately the same porosity level as comparable composites fabricated from non-perforated prepregs with edge breathing.

Trial 1—Non-Perforated Prepregs with Edge Breathing

The carbon fiber/epoxy composite of Trial 1 was fabricated from unidirectional prepregs comprising a polyacrylonitrile (PAN) based fiber, Thornel® T40/800 (Cytec Industries, West Paterson, N.J.), having an areal fiber weight of about 145 g/m$^2$. The matrix, comprising CYCOM® 5215 epoxy resin (Cytec Industries, West Paterson, N.J.), was partially impregnated such that the matrix weight fraction of the prepreg was approximately 35 wt. %. The prepreg was cut into sheets of approximately 30.5 cm×30.5 cm and approximately 30 of these sheets were stacked in a $(0)_{30}$ layup. The layup was bagged with silicone dams having breather strings along the edges to facilitate edge breathing, placed within a vacuum envelope, and subjected to a vacuum of approximately 20 mm Hg absolute for about 4 hours. Subsequently, the layup was cured by heating to a temperature of about 82° C. for about 4 hours. The composite laminate so formed was sectioned and polished and observed to possess a porosity of less than about 0.1 volume %.

Trial 2—Non-Perforated Prepregs with Edges Sealed

The carbon fiber/epoxy composite of Trial 2 was fabricated in a manner similar to Trial 1, except that the layup was bagged with all edges sealed using sealant tape, which substantially inhibited edge breathing. The composite laminate so formed was sectioned and polished and observed to possess a porosity of about 5.5 volume. %.

Trial 3—Perforated Prepregs with Edges Sealed

The carbon fiber/epoxy composite of Trial 3 was fabricated in a manner similar to Trial 2, except that the prepregs were mechanically perforated with a wood, cylindrically shaped pin roller about 18" long and 4" in diameter containing conical-shaped stell pins with dimensions of 6 mm high and 1 mm diameter at the base which terminate in a sharp tip evenly space approximately 6 mm apart. The pin roller pins penetrate a prepreg a selected distance through the thickness of the prepreg to form perforations. The greater the distance of penetration, the greater the size of the resulting perforation. The perforations may vary in size from about 100 μm to about 1 mm in diameter as desired, depending upon the density of the penetrations. Multiple passes of the pin roller across a prepreg will increase the density of resulting perforations as desired while maintaining a relatively consistent size of each perforation provide a perforation density of approximately 2 perforations/cm$^2$. The perforations extended substantially through the thickness of each prepreg layer resulting in perforation of about 300 μm in diameter and were introduced into the prepregs prior to layup. Composite laminates so formed were sectioned and polished and observed to possess a porosity of less than about 0.1 volume. %.

Example 1

Summary

TABLE 1

Summary of Example 1

| Trial | Matrix | Fiber | Partial Impregnation | Matrix Fraction (wt. %) | Perforations | Edge Breathing | Porosity (volume %) |
|---|---|---|---|---|---|---|---|
| 1 | Cycom 5215 | T40/800 | Yes | 35 | No | Yes | less than 0.1 |
| 2 | Cycom 5215 | T40/800 | Yes | 35 | No | No | 5.5 |
| 3 | Cycom 5215 | T40/800 | Yes | 35 | Yes | No | less than 0.1 |

The data of Table 1 show that the use of edge breathing, when fabricating non-perforated prepreg layups using vacuum pressure only, enabled a significant reduction in the porosity of the composite, from about 5.5 vol. % to less than about 0.1 vol. %. It was further observed that a similar reduction in the composite porosity could be achieved through the use of perforated prepregs, without the need for edge breathing.

Example 2

Carbon Fiber/Epoxy Composites Fabricated from Partially Impregnated Prepregs Using Autoclave Pressure and Vacuum Three carbon fiber/epoxy composites, trials 4, 5, and 6, were fabricated from partially impregnated prepregs with vacuum and autoclave pressure. Edge breathing and the presence and absence of perforations were varied to examine the effect of each upon the composite porosity. It was observed that composites fabricated with autoclave pressure from partially impregnated, perforated prepregs, without edge breathing, exhibited significantly lower porosity than composites fabricated under substantially identical conditions from partially impregnated prepregs without perforations. The porosity level of composites fabricated with autoclave pressure from perforated prepregs, without edge breathing, exhibited approximately the same porosity level as comparable composites fabricated from non-perforated prepregs with edge breathing and substantially less than a non-perforated prepreg without edge breaking.

Trial 4—Non-Perforated Prepregs with Edge Breathing

The carbon fiber/epoxy composite of Trial 4 was fabricated from unidirectional prepregs comprising a polyacrylonitrile (PAN) based fiber, HTS (Toho Tenax) having an areal fiber weight of about 190 g/m$^2$. The matrix, comprising CYCOM® 977-2 epoxy resin (Cytec Industries, West Paterson, N.J.), was partially impregnated such that the weight fraction of the prepreg was approximately 34 wt. %. A layup that was about 50.8 cm×50.8 cm was formed having multiple ply build-ups ranging in size between about 7.6 cm×7.6 cm to 10.2 cm×10.2 cm at about the center of the panel. The layup was configured with prepregs in an alternating, 0°/90° orientation about 20 plies with the buildup about an additional 20 plies interspersed within the larger plies. The layup was further configured such that a large amount of air, approximately 200 cm$^3$ in total was trapped between the prepreg layers near the build-up. The layup was bagged with silicone edge dams with breather strings along the edge such that the edges were attached to the breather. The layup was placed into a vacuum envelope and subjected to a vacuum of approximately 20 mm Hg absolute for about 4 hours. Subsequently, the layup was cured by heating to a temperature of about 177° C. and application of about 100 psi pressure for about 2 hours. The composite laminate so formed was sectioned and polished and observed to possess a porosity less than about 0.1 volume % throughout the laminate and in and around the ply build up areas.

Trial 5—Non-Perforated Prepregs with Edges Sealed

The carbon fiber/epoxy composite of Trial 5 was fabricated in a manner similar to Trial 4, except that the layup was bagged with all four edges sealed with vacuum sealant tape, substantially inhibiting edge breathing. The porosity of the composite laminate so formed, in and around the ply build up areas, was measured to more than about 5 volume %.

Trial 6—Perforated Prepregs with Edges Sealed

The carbon fiber/epoxy composite of Trial 6 was fabricated in a manner similar to Trial 5 with all four edges sealed with vacuum sealant tape, except that the prepregs were mechanically penetrated with a pin roller to provide a perforation density of approximately 2 perforations/cm$^2$ using the pin roller described in Example 1. The perforations extended substantially through the thickness of each prepreg layer prior to layup. The composite laminate so formed was sectioned and polished and observed to have porosity less than about 0.1 volume % throughout the laminate and in and around the ply build up areas.

Example 2

Summary

TABLE 2

Summary of Example 2

| Trial | Matrix | Fiber | Partial Impregnation | Matrix Fraction (vol. %) | Perforations | Edges Sealed | Porosity (volume %) |
|---|---|---|---|---|---|---|---|
| 4 | Cycom 977-2 | HTS | Yes | 34 | No | No | less than 0.1 |
| 5 | Cycom 977-2 | HTS | Yes | 34 | No | Yes | greater than 5 |
| 6 | Cycom 977-2 | HTS | Yes | 34 | Yes | Yes | less than 0.1 |

The data in Summary Table 2, show that the use of edge breather when fabricating non-perforated prepreg layups using vacuum and autoclave pressure enables a significant reduction in the porosity of the composite, from about 5 vol. % to less than about 0.1 vol. %. The data further shows that a similar reduction in the composite porosity could be achieved through the use of perforated prepregs, without the need for edge breathing.

Example 3

Carbon Fiber/Epoxy Composites Fabricated from Fully Impregnated Prepregs with Vacuum Bag Only (VBO) Conditions in an Oven Two carbon fiber/epoxy composites, trials 7 and 8, were fabricated from substantially fully impregnated prepregs. It was observed that, in composites fabricated with vacuum pressure only from fully impregnated, perforated prepregs, exhibit lower porosity than composites consolidated under substantially identical conditions from prepregs without perforations.

Trial 7—Non-Perforated Fully Impregnated Prepregs Without Edge Breathing

The carbon fiber/epoxy composite of Trial 7 was fabricated from unidirectional prepregs comprising Thornel® T40/800 having an areal fiber weight of about 145 g/m$^2$. The matrix, comprising CYCOM® 5215 epoxy resin, was substantially fully impregnated and the matrix weight fraction of the prepreg was approximately 35 vol. %. The prepreg was impregnated at a temperature of about 105° C., at approximately 1 meter/min speed and using slower line speeds so as to allow the resin to substantially fully impregnate the prepreg. The prepreg was cut into sheets of approximately 30.5 cm×30.5 cm and approximately 30 of these sheets were stacked in a (0)$_{30}$ layup. The layup was bagged with all four edges sealed with vacuum sealant tape and a pin pricked separator overlaid the edge sealed layup. The overlaid separator substantially inhibited gas removal by edge breathing and simulated a very large, slit tape part processed with vacuum only pressure. The bagged layup was placed within a vacuum envelope containing breathers and subjected to a vacuum of approximately 20 mm Hg absolute for about 4 hours. Subsequently, the layup was cure under vacuum only pressure by heating to a temperature of about 82° C. for about 4 hours. The composite laminate so formed was sectioned and polished and observed to possess a porosity of about 5 volume %.

Trial 8—Perforated Fully Impregnated Prepregs Without Edge Breathing

The carbon fiber/epoxy composite of Trial 8 was fabricated in a manner similar to Trial 7, except that the prepregs were mechanically penetrated with a pin roller to provide approximately 2 perforations/cm$^2$ using the pin roller described in Example 1. The perforations extended substantially through the thickness of each prepreg layer prior to layup The composite laminate so formed was polished and observed to possess a porosity of about 0.1 volume %.

TABLE 3

Summary of Example 3

| Trial | Matrix | Fiber | Full Impregnation | Matrix Fraction (vol. %) | Perforations | Edges Sealed | Porosity (volume %) |
|---|---|---|---|---|---|---|---|
| 7 | Cycom 5215 | Thornel T40/800 | Yes | 35 | No | Yes | 5 |
| 8 | Cycom 5215 | Thornel T40/800 | Yes | 35 | Yes | Yes | 0.1 |

The data in summary Table 3, show that subjecting fully impregnated, perforated prepreg layups to vacuum during the composite fabrication process enabled a significant reduction in the porosity of the composite, as compared with non-perforated prepreg layups, from about 5 vol. % to about 0.1 vol. %. These results show that the introduction of perforations within substantially fully impregnated prepregs significantly enhanced the removal of gases from the prepreg. Sealing the edges was performed in order to simulate a large part.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of forming a fiber-reinforced composite structure, the method comprising:
   providing a plurality of perforated prepregs comprising fibers lying in a plane, each of said prepregs being at least partially impregnated with a matrix resin, wherein perforations of said perforated prepregs extend substantially perpendicular to the plane of said fibers, and wherein at least some of the perforations extend through the entire thickness of the perforated prepregs;

forming a prepreg layup by laying up the plurality of perforated prepregs;

consolidating the prepreg layup by applying at least one of heat, external pressure, and vacuum to the prepreg layup so that the matrix resin flows to fill said perforations and to fill other void spaces within and between said prepregs; and curing the consolidated prepreg layup.

2. The method of claim 1, wherein said perforated prepregs are partially impregnated prepregs, wherein each partially impregnated prepreg comprises a matrix-free zone that is substantially free from said matrix resin, and wherein perforations of each partially impregnated prepreg communicate with said matrix-free zone.

3. The method of claim 1, wherein a viscosity of the matrix resin is greater than about 1,000,000 cP at about room temperature, and wherein heat is applied during said consolidating to cause the matrix resin to flow.

4. The method of claim 1, wherein at least some of the perforations are partial perforations extending partially through a selected thickness of the perforated prepregs.

5. The method of claim 1, wherein the resulting composite structure has a porosity of less than 10 vol. % on the basis of the total volume thereof.

6. The method of claim 1, wherein the perforations are formed by transmitting energy to each prepreg.

7. The method of claim 6, wherein the energy is transmitted in the form of a pin press piercing each prepreg from an outer surface through the thickness thereof.

8. The method of claim 6, wherein the energy is transmitted in the form of an ultrasonic pressure wave.

9. The method of claim 6, wherein the energy is transmitted by the application of heat.

10. The method of claim 6, wherein, on average, at least 1 perforation is present per 1.0 $cm^2$ of prepreg.

* * * * *